United States Patent [19]

Niwa

[11] Patent Number: 4,821,134

[45] Date of Patent: Apr. 11, 1989

[54] MAGNETIC ALLOY R/W HEAD WITH CENTRALLY PINCHED AND END SLOTTED CORE

[75] Inventor: Yoshikazu Niwa, Nagaokakyo, Japan

[73] Assignee: Mitsubishi Denki Kabushiki Kaisha, Tokyo, Japan

[21] Appl. No.: 929,313

[22] Filed: Nov. 12, 1986

[30] Foreign Application Priority Data

Nov. 14, 1985 [JP] Japan ............................. 60-255435

[51] Int. Cl.[4] ............................................. G11B 5/22
[52] U.S. Cl. .................................. 360/122; 360/119; 360/125
[58] Field of Search ............... 360/110, 119, 122, 125, 360/126, 127; 29/603

[56] References Cited

U.S. PATENT DOCUMENTS 4,152,741 5/1979 Mizuno et al. ..................... 360/119
4,559,572 12/1985 Kumasaka et al. ................. 360/110

FOREIGN PATENT DOCUMENTS 2642012  3/1977 Fed. Rep. of Germany ...... 360/126
52-37414  3/1977 Japan ................................ 360/125
55-122224 9/1980 Japan ................................ 360/119
60-231903 11/1985 Japan ................................ 360/119
2147448  5/1985 United Kingdom ............... 360/125

Primary Examiner—John H. Wolff
Attorney, Agent, or Firm—Sughrue, Mion, Zinn, Macpeak & Seas

[57] ABSTRACT

A composite magnetic R/W head has an alloy portion defined by, in plan view, two oppositely oriented U-shaped portions joined at their spaced bases by a gapped central bridging leg. The slits 19 between the legs of the U-shaped portions and the spaces flanking the bridging leg are filled with glass 16, 13. Such a construction exhibits reduced eddy current losses and enhanced high frequency performance.

7 Claims, 5 Drawing Sheets

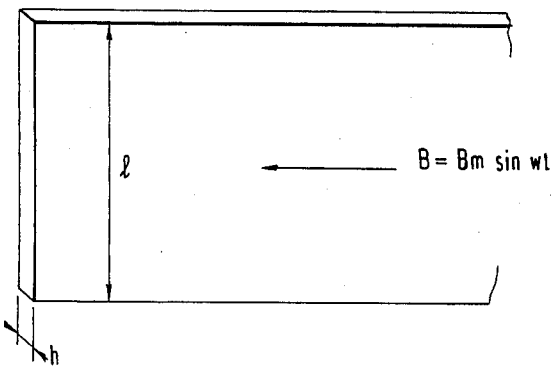
FIG.1
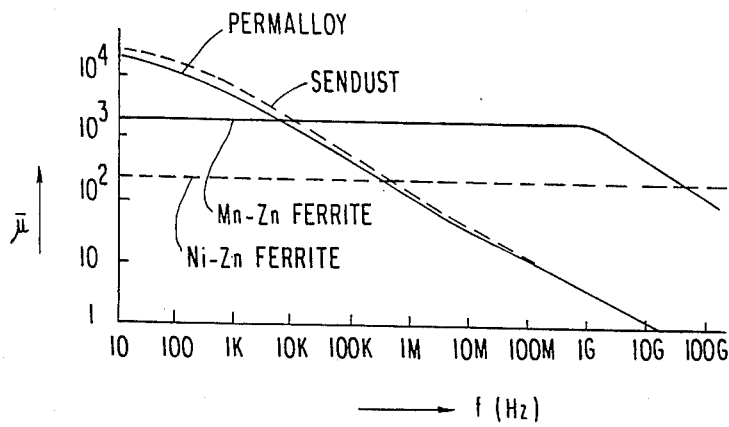
FIG.2
FIG.3
PRIOR ART
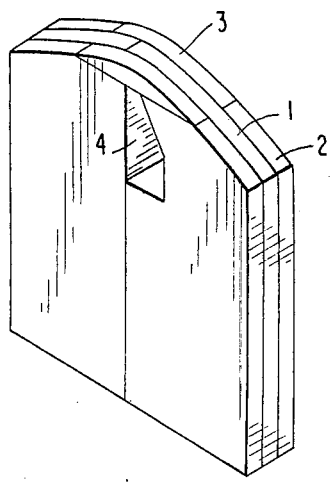
FIG.4
PRIOR ART
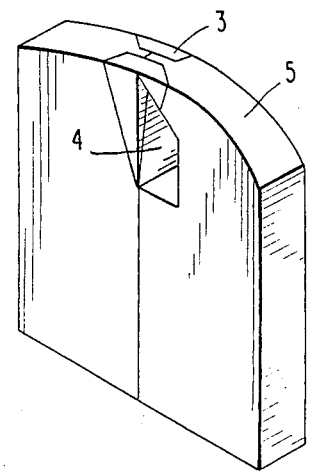

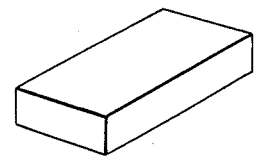
STEP (1)
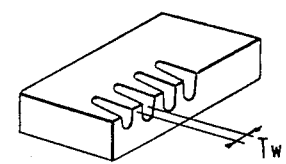
STEP (2)
STEP (3) STEP (4) STEP (5)
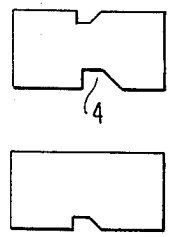 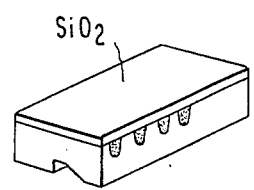 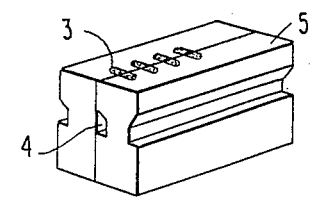
STEP (6)
STEP (7)
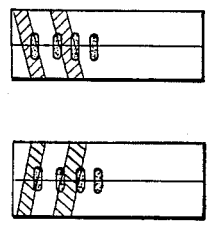 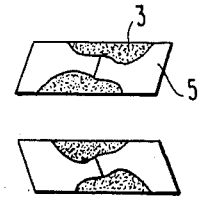 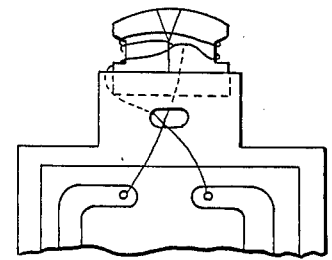
FIG.5
PRIOR ART

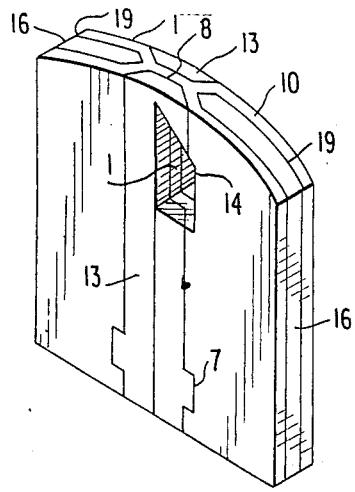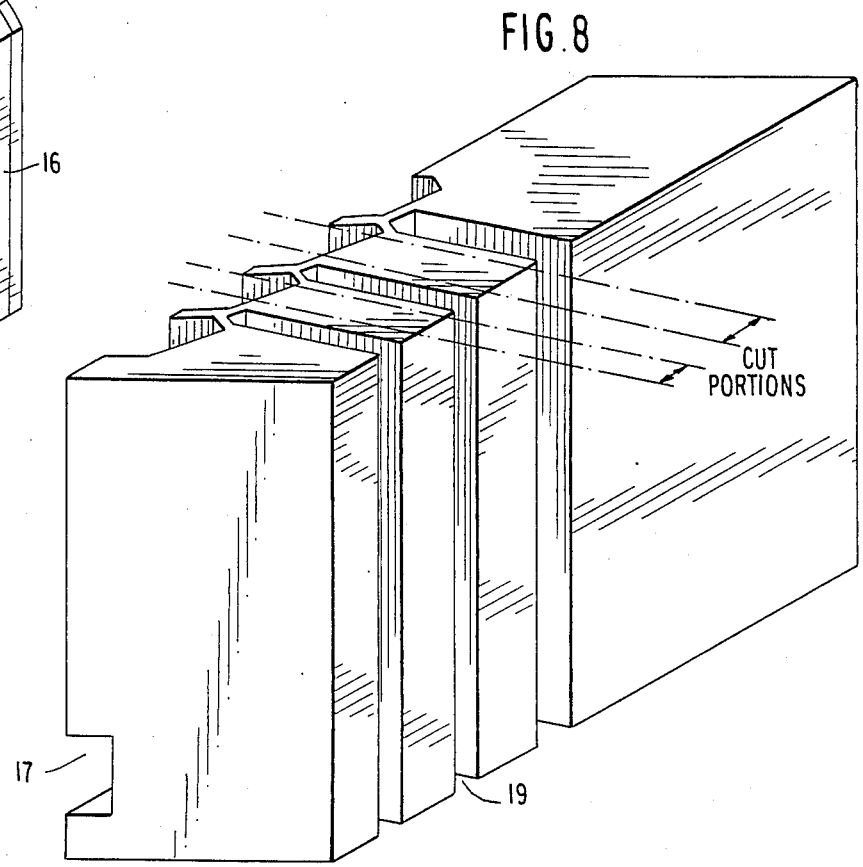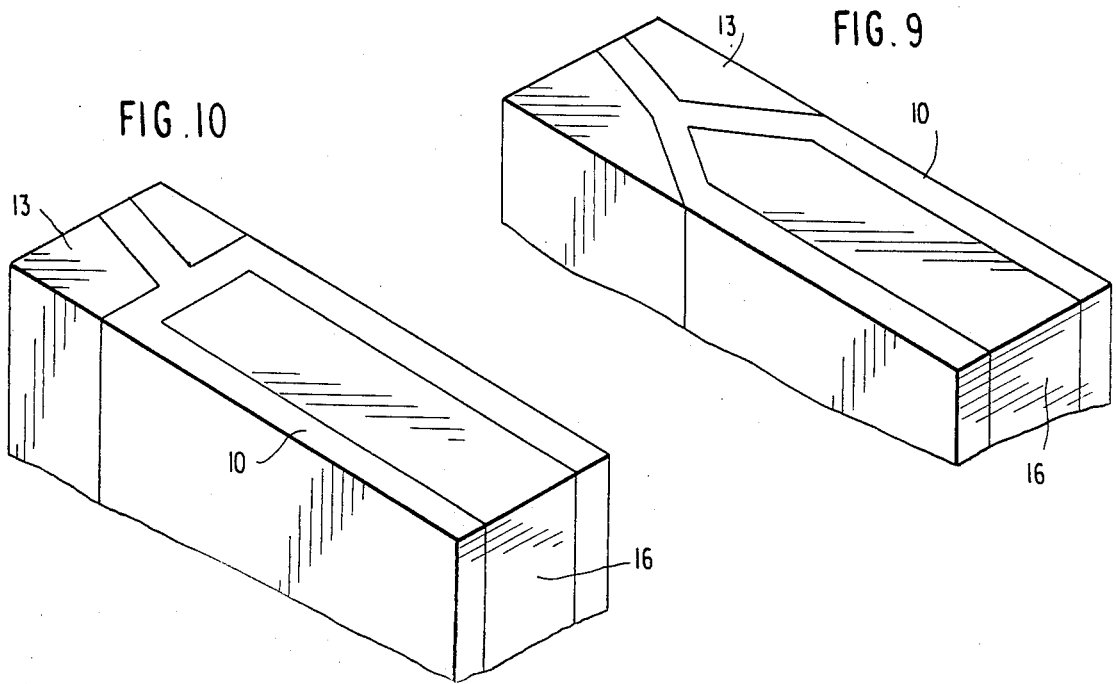

STEP (1) 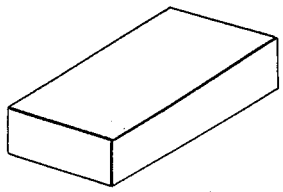
STEP (2) 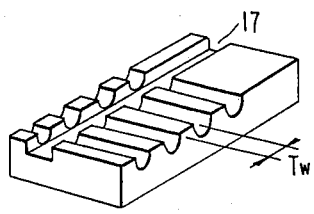
STEP (2A) 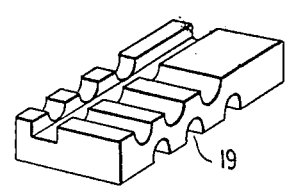
STEP (3) 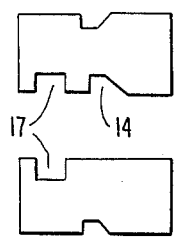
STEP (4) 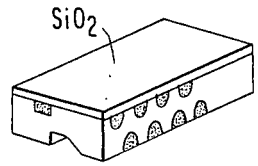
STEP (5) 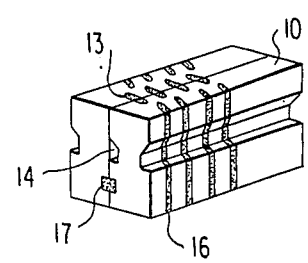
STEP (6) 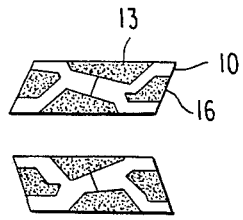
STEP (7) 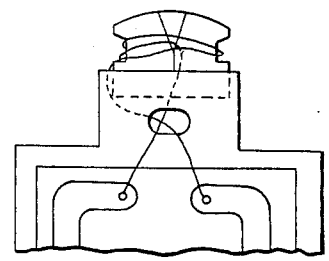
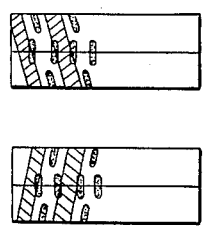
FIG. 7

MAGNETIC ALLOY R/W HEAD WITH CENTRALLY PINCHED AND END SLOTTED CORE

BACKGROUND OF THE INVENTION

This invention relates to a magnetic head for recording and reproducing information on magnetic media.

As is well known, a magnetic head using an alloy core which is low in specific resistance is susceptible to eddy current loss which lowers its high frequency characteristics.

In the case of an alloy plate with a specific resistance p as shown in FIG. 1, the eddy current loss We per unit volume is given by $We = \pi^2 h^2 f^2 Bm/6\rho$ ... (1), where h is the thickness of the alloy plate, f is the frequency of a recording signal, and Bm is the maximum flux density. Equation (1) is explained by the fact that the skin effect of a flux produced by a high frequency eddy current causes the magnetic permeability $\mu$ to be substantially reduced. That is, at an audio frequency of about 10 kHz or more the magnetic permeability $\mu$ of an alloy core falls below that of a ferrite core as shown in FIG. 2.

In an effort to solve this problem a conventional magnetic head having an alloy core has been made of a core plate whose thickness, namely h in equation (1), is made as small or as thin as possible. To meet this requirement, an alloy magnetic head as shown in FIG. 3 has been developed, which comprises a main core 1, two sub cores 2 sandwiching the main core, and two reinforcing glass plates 3 disposed on the magnetic tape abutting face of the sub cores, in which the main core 1 is made of alloy while the sub cores 2 are made of ferrite. The main core and the sub cores are respectively provided with a winding groove 4. The alloy magnetic head constructed as shown in FIG. 3 is not free from problems, however, as its manufacturing process is complicated and the number of processing steps result in a low productivity. Namely, a number of technical problems must be solved including how to obtain appropriate flatness levels, bonding intensity and accuracy, together with avoiding bending during the assembly of the main core and sub cores. The productivity is further reduced because of the process in which micro chips of the main core and sub cores have to be bonded to each other.

Another conventional magnetic head with a ferrite core is shown in FIG. 4, which has improved productivity. Such head comprises a main core 5 made of ferrite with a winding groove 4, and two reinforcing glass members 3; FIG. 5 shows the steps involved in its production. In step (1) a core block is cut out from a ferrite material. In step (2) a plurality of head gap defining grooves, spaced apart by a distance equal to the track width Tw, are formed in the core block and thereafter the reinforcing glass members 3 are deposited in the grooves. In step (3) the winding groove 4 is formed in the core block, and the head gap face of the block is polished. In step (4) a gap material of $SiO_2$ is sputtered onto the head gap face. In step (5) two core blocks are secured together by glass deposition so that the two gap faces confront each other. In step (6) a composite body made up of the two core blocks is cut to provide a plurality of head chips at an appropriate azimuth angle. The shadowed portions in the figure depict cut off areas. In step (7) a head chip is mounted on a circuit board, its face confronting the magnetic recording media is polished, and the coil is wound. A ferrite magnetic head thus constructed as shown in FIGS. 4 and 5 is still not free from problems, however, in that its saturation flux density is low.

SUMMARY OF THE INVENTION

These drawbacks and disadvantages of the prior art are overcome in accordance with the present invention by providing a composite magnetic head having an alloy portion defined by, in plan view, two oppositely oriented U-shaped portions joined at their spaced bases by a gapped central bridging leg. Slits between the legs of the U-shaped portions and the spaces flanking the bridging leg are filled with nonmagnetic reinforcing material, such as glass. Such a construction reduces eddy current losses and attendantly enhances the high frequency characteristics of the head.

BRIEF DESCRIPTION OF THE DRAWINGS

FIG. 1 is a perspective view of a core plate for explaining eddy current losses, FIG. 2 is a graph showing the relation between frequency and magnetic permeability of core materials, FIG. 3 is a perspective view of a conventional magnetic head having an alloy core, FIG. 4 is a perspective view of a conventional magnetic head having a ferrite core, FIG. 5 shows the steps involved in producing the magnetic head shown in FIG. 4, FIG. 6 is a perspective view of a magnetic head according to one embodiment of the invention, FIG. 7 shows the steps involved in producing the magnetic head shown in FIG. 6, FIG. 8 is a perspective view of a core block according to step (2A) in FIG. 7, FIGS. 9 and 10 are perspective views for explaining the slitting of the magnetic head shown in FIG. 6.

DETAILED DESCRIPTION OF THE PREFERRED EMBODIMENTS

Figure 11:
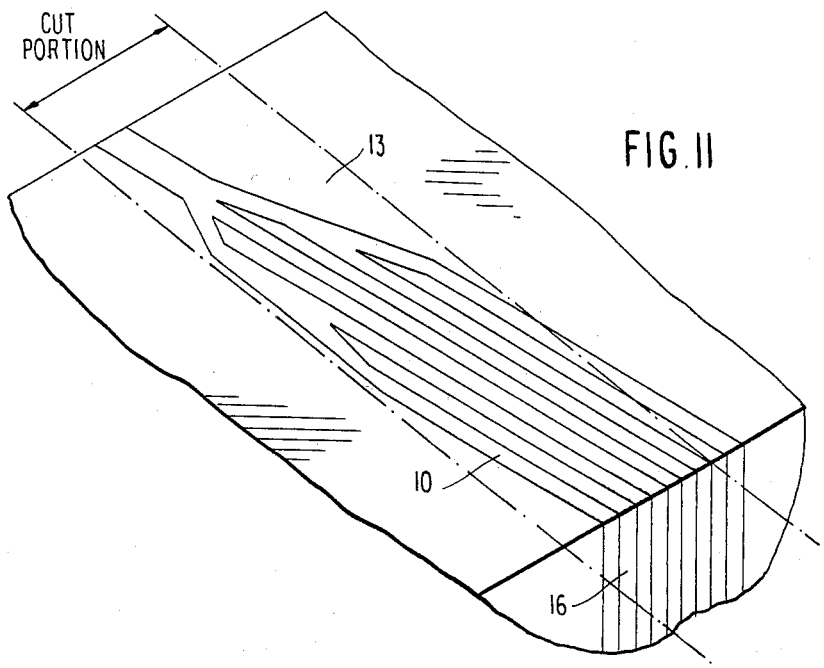
FIG. 11 is a perspective view of a core block according to another embodiment produced by step (2A) in FIG. 7.

Referring to FIG. 6, the magnetic head comprises a composite core which has two halves 10 and is reinforced with nonmagnetic material such as glass members 13 and 16. The core halves are made of an alloy, and have slits 19 formed on their respective sides. The two halves 10 are secured by glass deposition at their confronting surfaces, and a head gap 8 is formed between them. The transverse length of the head gap is equal to the track width of a magnetic tape. The reinforcing glass members 13 are disposed on both surfaces, covering the joint between the two core halves. The reinforcing glass members 16 are disposed within the slits 19 of the individual core halves. A winding opening 14 is formed in one of the halves and extends through the reinforcing glass members 13 and 16. A groove 17 is formed in each core half, and the reinforcing glass members 13 and 16 are joined to each other through the groove.

FIG. 7 shows the steps involved in producing the magnetic head of FIG. 6. In step (1) an alloy material is cut to form a core block. In step (2) a plurality of head gap defining grooves, spaced apart by the track width Tw, and the groove 17 are formed in the core block, and thereafter the reinforcing glass member 13 is deposited in such grooves. In the step (2A) a plurality of slits 19 are formed in the core block, whereafter the reinforcing glass member 16 is deposited in the slits. FIG. 8 shows an enlarged view of the core block having the grooves and the slits 19 cut therein. In step (3) the winding opening 14 is formed in the core block and the head gap surface of the block is polished. In step (4) a layer of $SiO_2$ gap material is sputtered onto the head gap surface. In step (5) two core blocks are secured together by glass deposition or the like, and in step (6) the joined blocks are cut to form a plurality of head chips or assemblies, as shown in FIG. 6, at the proper azimuth angle. The shadowed portions depict the cut off areas. In step (7) the head chip is fixed to a circuit board, its tape abutting face is polished, and a coil is wound through the opening 14.

By forming the slits 19 in the core as described above, it is possible to utilize the conventional process for producing a ferrite core as shown in FIGS. 4 and 5, and at the same time, a reduction of the core thickness is realized. Therefore, the flanking sub cores 2 as shown in FIG. 3 are not required. In equation (1) the eddy current loss is also reduced because the thickness h of the core has a lower value, which overcomes the disadvantage of alloy cores having a low specific resistance $\rho$.

In order to record a high density signal on magnetic tape, an azimuth recording technique is effective. Namely, the primary plane of the core and the direction of the gap defining central leg of the core are disposed at an acute angle to each other as shown in FIGS. 9 and 10, for example. Accordingly, if the slits 19 are formed parallel to the angled cut lines as shown in FIG. 8, the appropriate azimuth angle is achieved which minimizes the thickness of the core. To further minimize the core thickness at the bottoms of the slits, they are advantageously formed with V-shaped bottoms as shown in FIG. 9 rather than with flat bottoms as shown in FIG. 10.

On the other hand, if productivity and cost are more important than high frequency characteristics, the slits can be formed parallel to the central core leg as shown in FIG. 11, which further illustrates the use of a plurality of adjacent slits.

Figure 12:
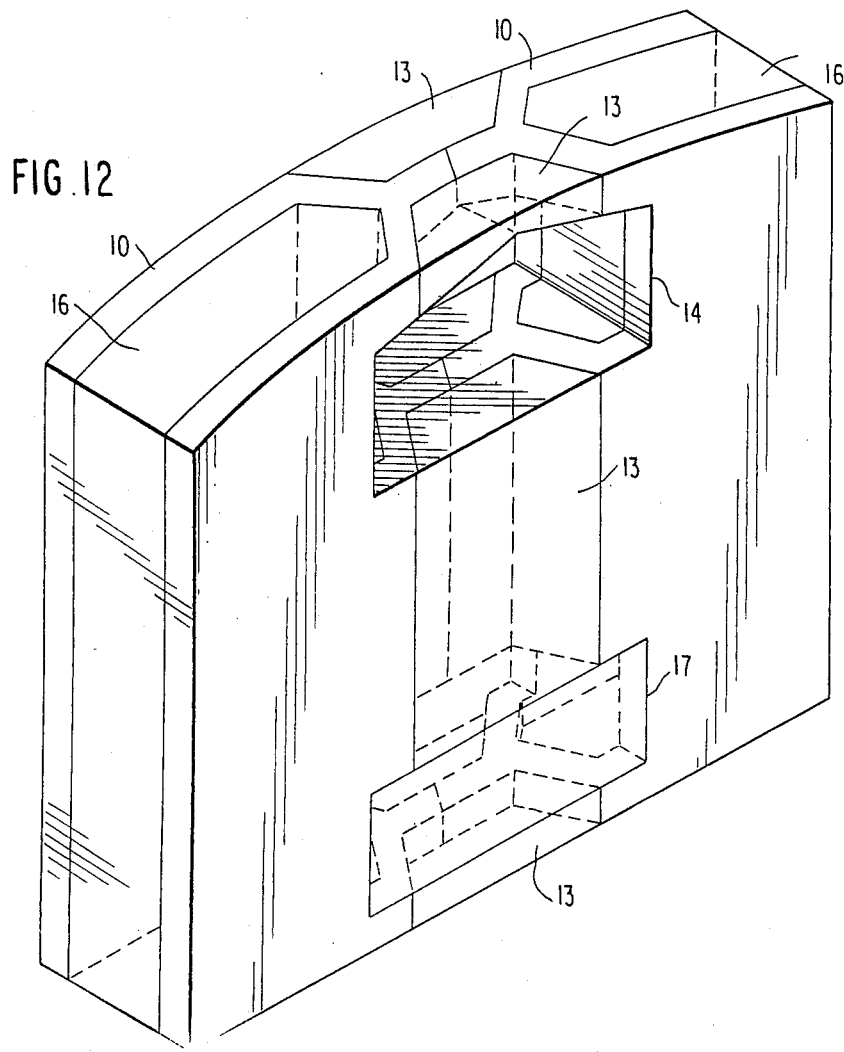
FIG. 12 is a perspective view showing the inner structure of a magnetic head according to an embodiment of the invention.

In order to mechanically strengthen the core given the different thermal expansion coefficients between the alloy and the reinforcing glass material and their poor chemical affinity, the groove 17 is formed as shown in FIG. 12 such that the four reinforcing glass portions 13, 16 are fused or linked together within the groove. Accordingly, it is possible to achieve adequate mechanical strength without depending on the chemical bonding intensity between the core alloy material and the nonmagnetic glass material.

What is claimed is:

1. A magnetic head for recording and reproducing a signal on a magnetic tape, comprising:
    (a) a thin composite core formed of magnetic alloy material and nonmagnetic reinforcing material, and having an elongate rectangular configuration when viewed from a tape facing surface thereof,
    (b) the magnetic alloy material having a configuration, when viewed from said tape facing surface, defined by two generally U-shaped portions with slit openings (19) between parallel legs of the respective U-shaped portions, the slit openings of the U-shaped portions facing away from each other, and a central leg member having a width no greater than that of each of said slit openings of said U-shaped portions and equal to a tape track width for reducing eddy current loss adjacent said magnetic gap, and said leg member connects base portions of said U-shaped portions.
    (c) the nonmagnetic reinforcing material (16) filling said slit openings, and nonmagnetic reinforcing material (13) filling both spaces flanking said central leg member and contiguous base portions of said U-shaped portions to complete said elongate rectangular configuration, and
    (d) a signal recording/reproducing gap extending transversely across said central leg member.

2. A magnetic head according to claim 1, further comprising:
    (a) a coil winding opening (14) extending transversely through the core proximate a central portion thereof, and
    (b) a bonding zone (17) extending transversely through the core proximate a central portion thereof spaced from the winding opening, said bonding zone being occupied by a unitary region of reinforcing material fused to the reinforcing material filling the slit openings and the flanking spaces.

3. A magnetic head according to claim 2, wherein the nonmagnetic material is glass.

4. A magnetic head according to claim 3, wherein said gap extends obliquely across the central leg member.

5. A magnetic head according to claim 4, wherein said slit openings have V-shaped bottoms.

6. A magnetic head according to claim 1, wherein a width of the rectangular configuration of the core is greater than the width of the central leg member and track width, and a width of the U-shaped portions is equal to the width of the core.

7. A magnetic head according to claim 1, wherein said nonmagnetic reinforcing material is provided so as to be contiguous within said core.

* * * * *